United States Patent
Koo et al.

(10) Patent No.: US 8,880,123 B2
(45) Date of Patent: Nov. 4, 2014

(54) APPARATUS AND METHOD FOR RUNNING APPLICATION IN MOBILE TERMINAL

(75) Inventors: Hye-Won Koo, Seoul (KR); Han-Jun Ku, Suwon-si (KR); Do-Yeon Kim, Seoul (KR); Eun-Joo Lee, Daegu (KR); Chung-Kyu Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 84 days.

(21) Appl. No.: 13/599,179

(22) Filed: Aug. 30, 2012

(65) Prior Publication Data

US 2013/0072264 A1 Mar. 21, 2013

(30) Foreign Application Priority Data

Sep. 20, 2011 (KR) .................. 10-2011-0094588

(51) Int. Cl.
*H04B 1/38* (2006.01)
*G06F 3/0488* (2013.01)

(52) U.S. Cl.
CPC .................................... *G06F 3/0488* (2013.01)
USPC ............ 455/566; 715/769; 715/790; 715/781

(58) Field of Classification Search
USPC ............ 715/769, 781, 790; 455/566; 345/173
See application file for complete search history.

(56) References Cited

U.S. PATENT DOCUMENTS

| | | | |
|---|---|---|---|
| 7,458,032 | B2 | 11/2008 | Terada |
| 2008/0297483 | A1 | 12/2008 | Kim et al. |
| 2009/0237372 | A1 | 9/2009 | Kim et al. |
| 2010/0122195 | A1* | 5/2010 | Hwang .................. 715/769 |
| 2011/0061020 | A1 | 3/2011 | Yoo et al. |
| 2012/0084691 | A1* | 4/2012 | Yun ..................... 715/769 |

FOREIGN PATENT DOCUMENTS

| | | |
|---|---|---|
| EP | 2 060 970 A1 | 5/2009 |
| KR | 10-2008-0104857 A | 12/2008 |
| KR | 10-2009-0049025 A | 5/2009 |
| KR | 10-2009-0116843 A | 11/2009 |
| KR | 10-2009-0119410 A | 11/2009 |

* cited by examiner

*Primary Examiner* — David Q Nguyen
(74) *Attorney, Agent, or Firm* — Jefferson IP Law, LLP

(57) ABSTRACT

An apparatus and method for running an application in a mobile terminal are provided. The apparatus includes a display for running a second application on a first screen according to a second touch event, and displaying a second screen smaller than the first screen, and a controller for hiding the second screen from a current screen to display an entire area of the first screen while a touch in an external area of the second screen is detected, and displaying again the second screen on the first screen if the touch in the external area of the second screen is released.

18 Claims, 7 Drawing Sheets

APPARATUS AND METHOD FOR RUNNING APPLICATION IN MOBILE TERMINAL

PRIORITY

This application claims the benefit under 35 U.S.C. §119 (a) of a Korean Patent Application filed in the Korean Intellectual Property Office on Sep. 20, 2011 and assigned Serial No. 10-2011-0094588, the entire disclosure of which is hereby incorporated by reference.

BACKGROUND OF THE INVENTION

1. Field of the Invention

The present invention relates to an apparatus and method for running applications in a mobile terminal. More particularly, the present invention relates to an apparatus for running an application and method capable of quickly running applications in a mobile terminal.

2. Description of the Related Art

Due to recent advances in mobile terminal technology, mobile terminals are increasingly used to run or execute a wide variety of applications. In order for a user to make or generate a note having information about an application on a mobile terminal while running the application, the user may run or execute a memo application after terminating the application for which a note is to be generated, and then generates the note having the information using the memo application.

Furthermore, in order for the user to review the information about the application while, in the memo application, making the note having the information about the application, the user may need to again execute the application after terminating the memo application. As stated above, while making the note having the information about the application in the memo application, the user may be inconvenienced by repeatedly running and terminating the applications on which the note is about.

SUMMARY OF THE INVENTION

Aspects of the present invention are to address at least the above-mentioned problems and/or disadvantages and to provide at least the advantages described below. Accordingly, an aspect of the present invention is to provide an application running apparatus and method capable of quickly running applications in a mobile terminal.

Another aspect of the present invention is to provide an apparatus for running an application and method capable of quickly switching between applications in a mobile terminal.

Another aspect of the present invention is to provide an apparatus for running an application and method capable of allowing a user to easily see the contents on a background screen while running an application on a screen window.

Another aspect of the present invention is to provide an apparatus for running an application and method for using data executed on a screen window for running an application, as data for another application.

In accordance with one aspect of the present invention, an apparatus for running an application in a mobile terminal is provided. The apparatus includes a display for running a second application on a first screen according to a second touch event, and displaying a second screen smaller than the first screen, and a controller for hiding the second screen from a current screen to display an entire area of the first screen while a touch in an external area of the second screen is detected, and displaying again the second screen on the first screen if the touch in the external area of the second screen is released.

In accordance with another aspect of the present invention, an apparatus for running an application in a mobile terminal is provided. The apparatus includes a display for displaying, in a semi-transparent window, a second screen on which a second application is run according to a second touch event, on a first screen on which a first application is run according to a first touch event, to display the first screen through the second screen, and a controller for, when an input action occurs on the second screen, banning an operation associated with the input action from being performed on the first screen under the second screen, and performing the operation associated with the input action on the second screen.

In accordance with another aspect of the present invention, an apparatus for running an application in a mobile terminal is provided. The apparatus includes a display for displaying on a current screen an object for running an application corresponding to a type of a touch even, and a controller for displaying an object for running an application according to a type of a touch event, and hiding the object in response to a touch event having occurred in an external area of the object while displaying the object.

In accordance with further another aspect of the present invention, a method for running an application in a mobile terminal is provided. The method includes, running a second application on a first screen according to a second touch event, and displaying a second screen smaller than the first screen, hiding the second screen from a current screen to display an entire area of the first screen while a touch in an external area of the second screen is detected, and displaying again the second screen on the first screen if the touch in the external area of the second screen is released.

In accordance with yet another aspect of the present invention, a method for running an application in a mobile terminal is provided. The method includes, displaying, in a semi-transparent window, a second screen on which a second application is run according to a second touch event, on a first screen on which a first application is run according to a first touch event, to display the first screen through the second screen, and when an input action occurs on the second screen, banning an operation associated with the input action from being performed on the first screen under the second screen, and performing the operation associated with the input action on the second screen.

In accordance with yet another aspect of the present invention, a method for running an application in a mobile terminal is provided. The method includes, if a touch event occurs, displaying an object for running an application according to a type of the touch event having occurred, and hiding the object if a touch event occurs in an external area of the object while displaying the object. Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
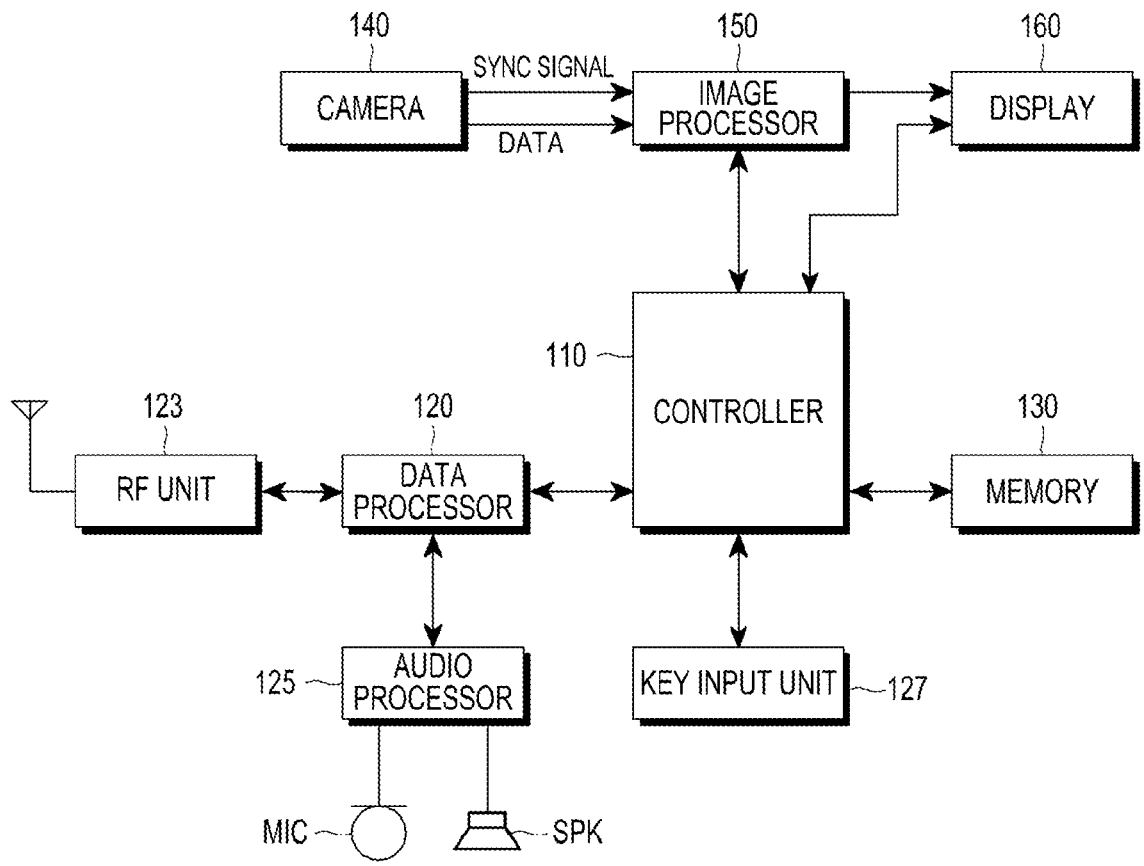
FIG. 1 illustrates a structure of a mobile terminal according to an exemplary embodiment of the present invention.

FIG. 1 illustrates a structure of a mobile terminal according to an exemplary embodiment of the present invention.

Referring to FIG. 1, a Radio Frequency (RF) unit 123 provides radio communications for the mobile terminal. The RF unit 123 includes an RF transmitter (not shown) for frequency up-converting of transmission signals and amplifying the up-converted signals, and an RF receiver (not shown) for low-noise-amplifying of received signals and frequency down-converting the amplified signals. A data processor 120 includes a transmitter for encoding and modulating the transmission signals, and a receiver for demodulating and decoding the received signals. In other words, the data processor 120 may include a modem and a codec. The codec includes a data codec for processing packet data, and an audio codec for processing audio signals such as voice or other similar audio signals. An audio processor 125 plays received audio signals output from the audio codec of the data processor 120 using a speaker SPK, and transfers transmission audio signals picked up by a microphone MIC to the audio codec in the data processor 120.

A key input unit 127 includes keys for inputting numeric and text information and function keys for setting various functions. However, the present invention is not limited thereto, and the mobile terminal may include a touchscreen or other similar elements for inputting numeric and text information.

A memory 130 may include a program memory and data memory. The program memory may store programs for controlling the general operation of the mobile terminal. The data memory may temporarily store the data generated during execution of these programs. The memory 130 may store information about types of executable applications, associated with types of touch events.

According to the present exemplary embodiment of the present invention, the memory 130 may store a control program for displaying a separate screen window for running an application according to a type of a touch event having occurred on the touch screen so as to run the application. The memory 130 may store a control program for hiding the screen window in response to a touch event that has occurred in an external area of the screen window while the separate screen window for running an application is displayed, and displaying the screen window if the touch event is terminated.

A controller 110 controls the overall operation of the mobile terminal. The controller 110 displays a screen window for running an application according to a type of a touch event having occurred on the touch screen so as to run the application, and hides the screen window in response to a touch event that has occurred in an external area of the screen window while displaying the screen window. The controller 110 may display a separate window by overlapping the screen window for running the application on the current screen. In other words, the controller 110 may display the application in a separate window that is displayed on top of other windows of the screen window.

While displaying the screen window for running the application according to the type of the touch event having occurred, if a touch event occurs on the screen window, then the controller 110 exits, i.e., stops displaying, the screen window on which the touch event has occurred, and displays a screen window for running an application corresponding to the type of the touch event having occurred.

While displaying the screen window for running the application according to the type of the touch event having occurred, if a touch event occurs on the screen window, then the controller 110 displays a list of applications, exits the screen window on which the touch event has occurred, and then displays a screen window for running an application selected from the list of applications displayed by the controller 110. If the touch event that occurred in an area of the screen other than the screen window for running the application is terminated due to a type of the touch event, then the controller 110 displays the screen window.

While hiding the screen window for running the application according to the type of the touch event having occurred, if an application is selected on the current screen by a drag event that occurred while the touch event is maintained, then the controller 110 stores data executed on the screen window as data for the application selected by the touch and drag events, and at the same time, stops displaying the hidden screen window.

While hiding the screen window for running the application according to the type of the touch event having occurred, the controller 110 updates the application. The controller 110 may update only synchronizable applications, and may update the applications only if their synchronization time is longer than a time period from the time the screen window was displayed till the time the screen window was hidden. However, the present invention is not limited thereto, and the controller 110 may update applications in any suitable manner.

While displaying the screen window for running the application according to the type of the touch event having occurred, the controller 110 may update the application, or the controller 110 may update the application when the screen window is exited or no longer displayed.

The controller 110 may display the screen window for running the application in a semi-transparent manner depending on the type of the touch event having occurred. When the screen window is displayed in a semi-transparent manner, the user may run the application in the semi-transparent screen window while viewing the contents displayed on the background screen. As to a user's input action occurring on the activated semi-transparent screen window, the action is performed only on the screen window without affecting the background screen or the items, elements or applications displayed on the background screen. While displaying the screen window for running the application according to the type of the touch event having occurred, if an exit button or key is selected or an exit command input on the screen window, then the controller 110 stops displaying the screen window for running the application.

A camera 140 includes a camera sensor for capturing images by capturing an optical image signal and converting the captured optical image signal into an electrical signal that may be an analog image signal or a digital image signal. The camera 140 also includes a signal processor for converting the analog image signal captured by the camera sensor into digital data. The camera sensor may be a Charge-Coupled Device (CCD) or Complementary Metal-Oxide-Semiconductor (CMOS) sensor, and the signal processor may be implemented with a Digital Signal Processor (DSP). However, the present invention is not limited thereto, and the camera sensor and the signal processor may be implemented in any suitable manner. The camera sensor and the signal processor may be implemented either in an integrated way, or in a separated way.

An image processor 150 performs Image Signal Processing (ISP) for displaying the image signals output from the camera 140 on a display 160. The ISP performs functions such as gamma correction, interpolation, spatial variations, image effects, image scaling, Automatic White Balance (AWB), Automatic Exposure (AE), and Automatic Focus (AF), and other similar image processing operations and functions. The image processor 150 processes the image signals output from the camera 140 on a frame-by-frame basis, and outputs the frame image data according to characteristics and a size of the display 160. The image processor 150 includes a video codec, which compresses the frame image data displayed on the display 160 according to a preset coding scheme, and decompresses the compressed frame image data into the original frame image data. The video codec may include a Joint Photographic Experts Group (JPEG) codec, a Moving Picture Experts Group 4 (MPEG4) codec, a Wavelet codec, or any other similar video codec. The image processor 150 includes an On-Screen Display (OSD) function, and may output OSD data according to the size of the screen displayed under control of the controller 110.

The display 160 includes a screen (not shown) for displaying image signals output from the image processor 150 and user data output from the controller 110. The display 160 may be a Liquid Crystal Display (LCD), an Organic Light Emitting Diode (OLED) display, or any other suitable display type. In the case of the LCD, the display 160 may include an LCD controller, a memory capable of storing image data, and an LCD panel. When the screen of the display 160 is implemented in as a touch screen, the LCD or other suitable display type may serve as an input unit. In this case, keys such as the key input unit 127 may be displayed on the display 160.

In accordance with the present exemplary embodiment of the present invention, the display 160 displays a separate window by overlapping the screen window for running the application on the current screen according to the type of the touch event having occurred to run the application.

The operation of running an application in a mobile terminal will be described in detail below with reference to FIGS. 2A to 7B.

Figure 2A:
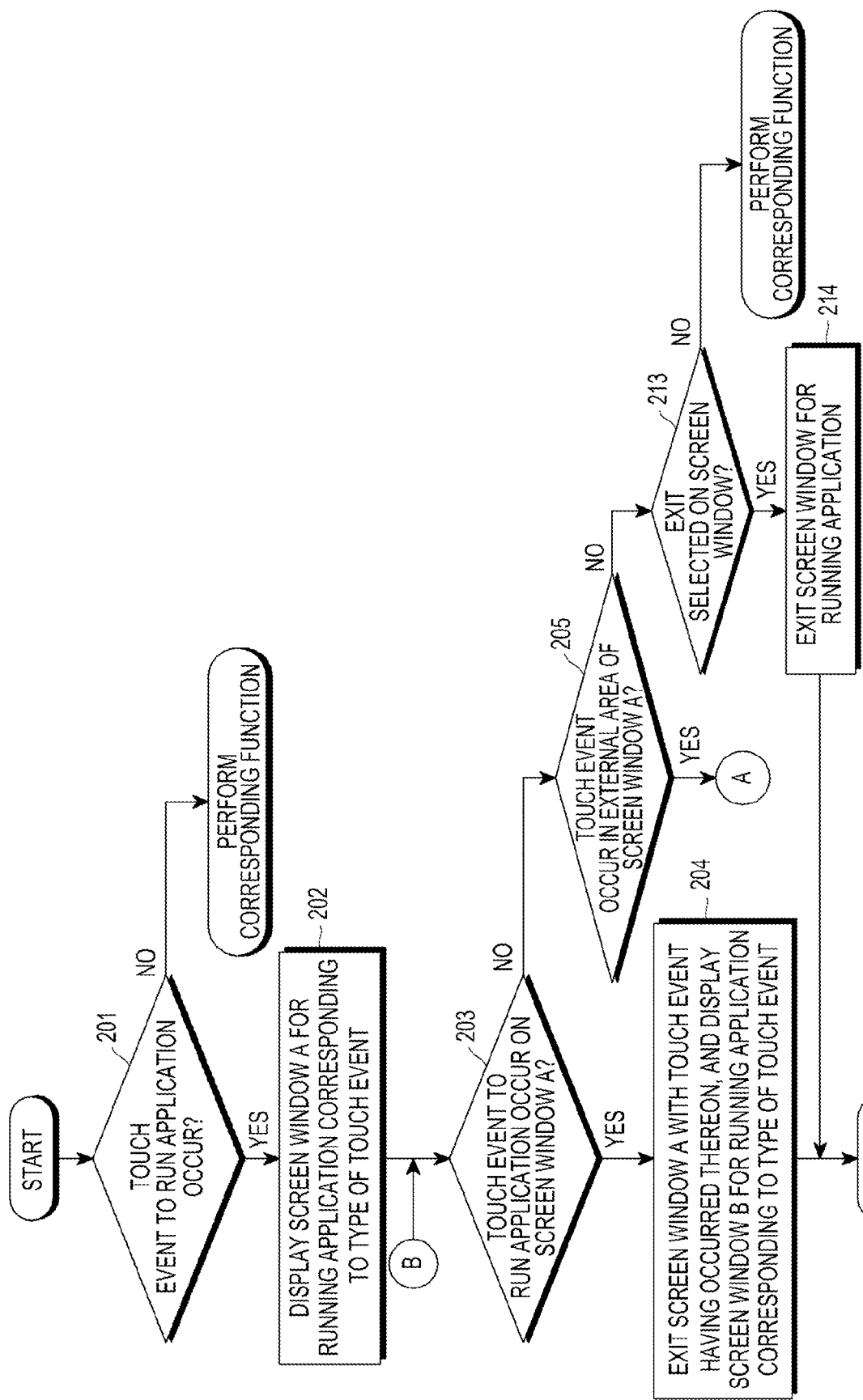
FIGS. 2A and 2B illustrate a process of running an application in a mobile terminal according to an exemplary embodiment of the present invention.
Figure 2B:
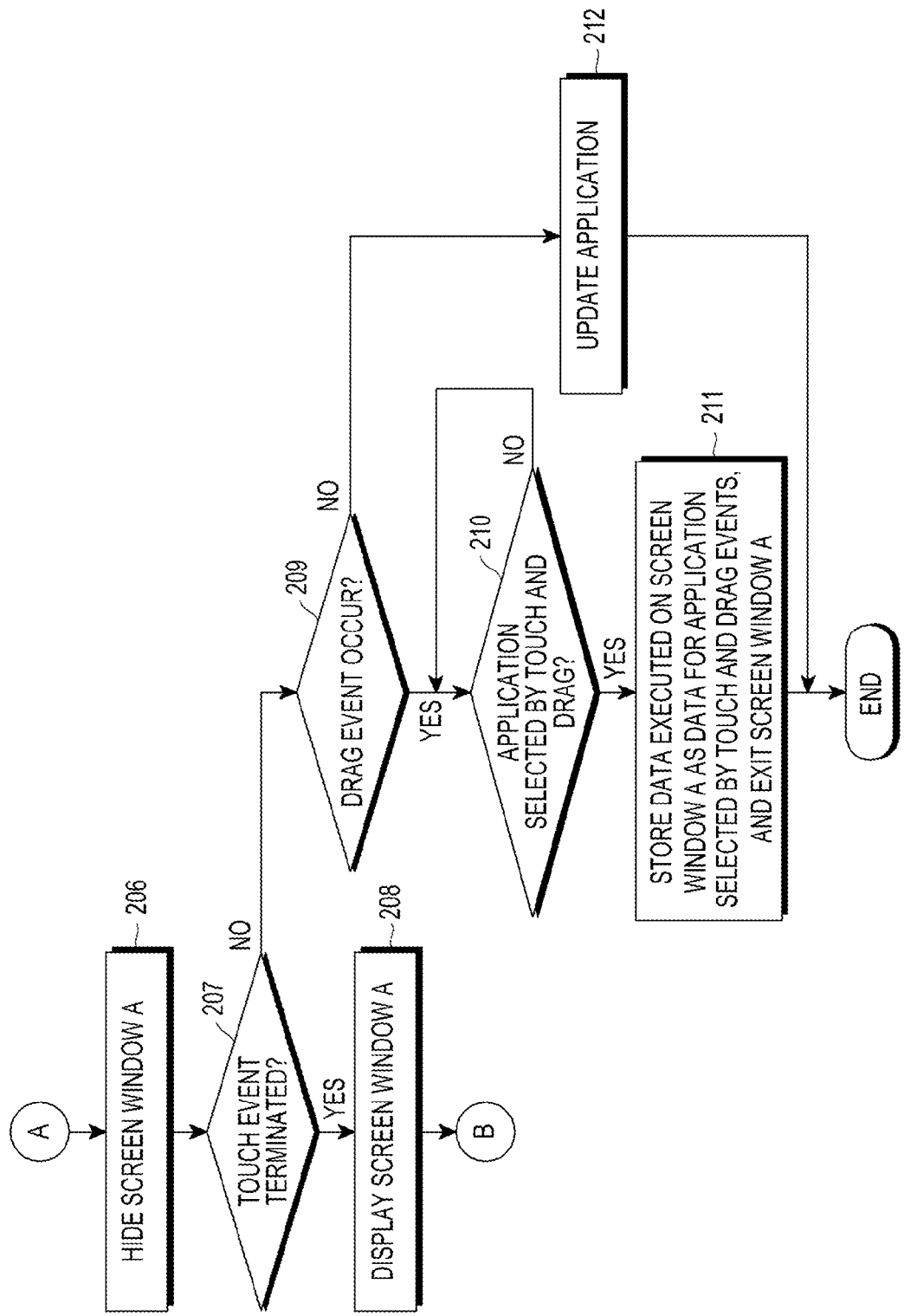

FIGS. 2A and 2B illustrate a process of running an application in a mobile terminal according to an exemplary embodiment of the present invention.

Referring to FIGS. 1, 2A and 2B, if a touch event to run an application occurs in the mobile terminal in step 201, then, in step 202, the controller 110 determines a type of the touch event having occurred and displays a screen window A for running an application according to the type of the touch event having occurred. In step 202, the controller 110 determines a type of the application corresponding to the type of the touch event having occurred using the memory 130, and then displays a separate window by overlapping the screen window A for running the detected application on the current screen of the display 160.

The type of the touch event may be determined according to the number of touch inputs and the touch input time, i.e., an amount of time for which the touch input occurs. In a case where a stylus pen is used, the type of the touch event may be determined according to the number of touch inputs and the touch input time, which occur when a button mounted on the stylus pen is input or pressed.

While displaying the screen window A in step 202, the controller 110 determines, in step 203, whether a touch event to run an application occurs in an area of the screen window A. If a touch event occurs on the screen window A, then, in step 204, the controller 110 determines a type of the application corresponding to the type of the touch event having occurred using the memory 130, stops displaying the screen window A, and displays a separate window by overlapping a screen window B for running the detected application on the current screen.

Although not shown in FIG. 2, while displaying the screen window A in step 202, if a touch event to run an application occurs in an area of the screen window A, the controller 110 may display a list of applications, and if an application is selected from the application list, the controller 110 may exit the screen window A and display a separate window by overlapping a screen window for running the selected application on the current screen.

While displaying the screen window A in step 202, the controller 110, in step 205, determines whether a touch event occurs in an external area of the screen window A. If a touch event occurs in an external area of the screen window A, then the controller 110 hides the screen window A by inactivating it in step 206. A type of the touch event for hiding the screen window A by inactivating it may be a variety of touch input actions. Therefore, the screen window A is hidden while the touch input action is maintained in then external area of the screen window A, so that the user may view the contents on the background screen of the screen window A.

While hiding the screen window A in step 206, the controller 110, in step 207, determines whether the touch event is terminated, i.e., the touch input is not maintained. If so, then in step 208, the controller 110 displays again the screen window A on the current screen by activating it. In steps 205 to 208, by repeating the displaying and hiding of the screen window A in response to the touch event, the user may run the application on the screen window A while viewing the contents on the background screen of the screen window A.

If the touch event having occurred is maintained in step 207 while the screen window A is hidden in step 206, then the controller 110 determines whether a drag event occurs in step 209. If a drag event occurs, then in step 210, the controller 110 determines whether an application is selected by the touch and drag events. If an application is selected by the touch and drag events, the controller 110 stores the data executed on the screen window A as data for the application selected by the touch and drag events and exits or stops displaying the screen window A in step 211.

For example, if a recipient is selected from a list of contacts provided by messaging or e-mail applications by touch and drag events on the current screen, which is the screen through which the controller 110 runs a message application after hiding the screen window A, then the memo data executed on the screen window A may be stored as data for the recipient, or may be stored as attached data in a message or e-mail that is sent to the recipient after the controller 110 automatically switches to a message/e-mail mode or switches to the messaging or e-mail applications. For example, if a date is selected from a list of dates provided by a calendar application by touch and drag events on the current screen on which the controller 110 runs the calendar application after hiding the screen window A, then the memo data executed on the screen window A may be stored as data corresponding to the selected date.

As another example, if an icon representing a type of an application, such as a message application, e-mail application and an album application, is selected by touch and drag events on the current screen for which the controller 110 is in an standby mode after hiding the screen window A, then the memo data executed on the screen window A may be stored as attached data after the controller 110 switches to a message or e-mail mode, or the memo data may be stored as data corresponding to an image selected from the album.

While hiding the screen window A in step 206, the controller 110 updates applications installed in the mobile terminal in step 212. More particularly, in step 212, the controller 110 updates synchronizable applications, and may update the applications only if their synchronization time is longer than a time period starting from a time at which the screen window A was displayed until a time at which the screen window A was hidden. While displaying the screen window A, the controller 110 may update the applications, or the controller 110 may update the applications only when the screen window A is exited.

For example, when the mobile terminal is set to update an application only in the state where the screen window A is hidden, if the screen window A for running a memo application is displayed so as to overlap with the current screen of a messenger application that is currently running, then the controller 110 does not update the application. Thereafter, if the screen window A is hidden, then the controller 110 compares a synchronization time for the messenger application with a time period from when the time the screen window A was displayed until the time when the screen window A was hidden, in order to update the synchronizable messenger application. For example, if a synchronization time for the messenger application is set as '5 seconds' and a time period from the time when the screen window A was displayed until the time when the screen window A was hidden is '3 seconds', i.e., the synchronization time for the messenger application, that being 5 seconds, is longer than the time period from when the time the screen window A was displayed until the time when the screen window A was hidden, that being 3 seconds, then the controller 110 updates the messenger application. For example, the controller 110 may display the conversations made while the screen window A is seen, thereby preventing the update from frequently occurring every time the screen window A is hidden.

If updating of the application is set to occur in the state where the screen window A is hidden, then the controller 110 may update the synchronizable messenger application and display it on the background screen when displaying the screen window A, which is for displaying the memo application, on the current screen in an overlapping manner.

If updating of the application is set to occur only when the screen window A is exited, then the controller 110 may update the synchronizable messenger application and display it when the screen window A is completely exited and while displaying the screen window A on the current screen displaying the messenger application in an overlapping manner.

While displaying the screen window A in step 202, the controller 110, in step 213, determines whether an exit button, key or input is selected on the screen window A. If the exit button, key or input is selected on the screen window A, the controller 110 exits or stops displaying the screen window A in step 214.

The operation of displaying and hiding the screen window in response to the touch event in FIGS. 2A and 2B will be described with reference to FIGS. 3A to 7B.

Figure 3A:
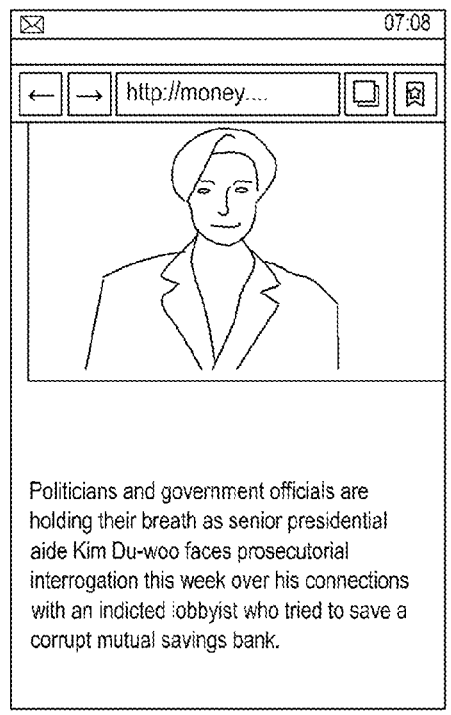
FIGS. 3A to 3C illustrate a process of running a memo application during Internet access in a mobile terminal according to an exemplary embodiment of the present invention.
Figure 3B:
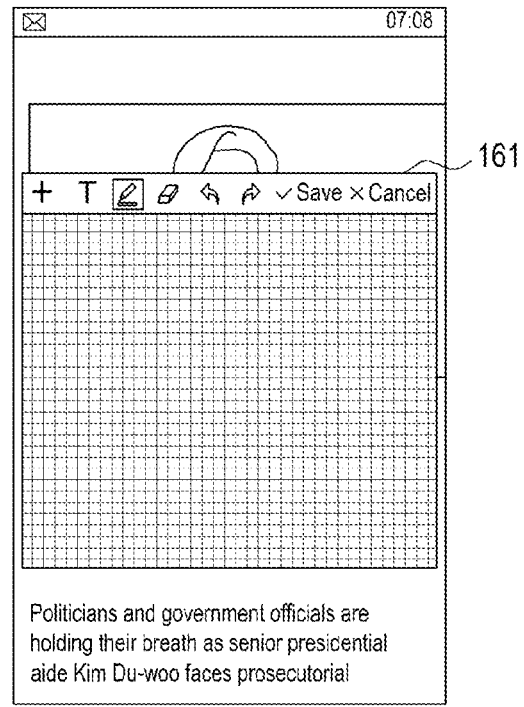
Figure 3C:
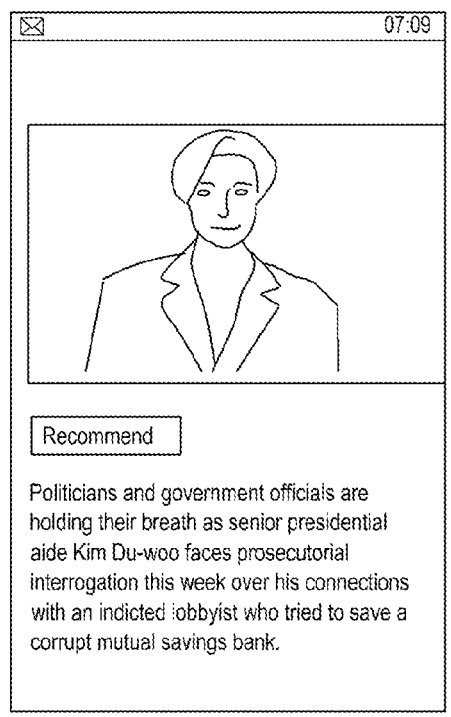

FIGS. 3A to 3C illustrate a process of running a memo application during Internet access in a mobile terminal according to an exemplary embodiment of the present invention.

Referring to FIGS. 3A to 3C, while the user views an article, image, video, or website over the Internet, as shown in FIG. 3A, if a touch event to run the memo application occurs on the screen displaying the article, regardless of the area at which the touch event occurs on the screen, then a separate window may be displayed by overlapping a screen window 161 for running the memo application on the current screen displaying the article, as shown in FIG. 3B. While displaying the screen window 161, if a touch event (i.e., a touch input) occurs and is maintained in an external area of the screen window 161 on the entire screen, then the screen window 161 may be hidden, as shown in FIG. 3C, allowing the user to view the current screen displaying the article. While hiding the screen window 161, as shown in FIG. 3C, if the touch event having occurred is terminated, then a separate window may be displayed again so as to overlap the screen window 161 on the current screen, as shown in FIG. 3B.

Figure 4A:
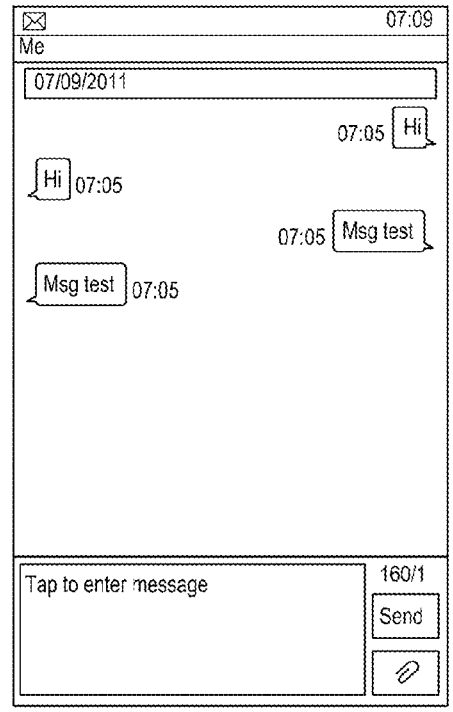
FIGS. 4A to 4C illustrate a process of running a memo application during use of a messenger application in a mobile terminal according to an exemplary embodiment of the present invention.
Figure 4B:
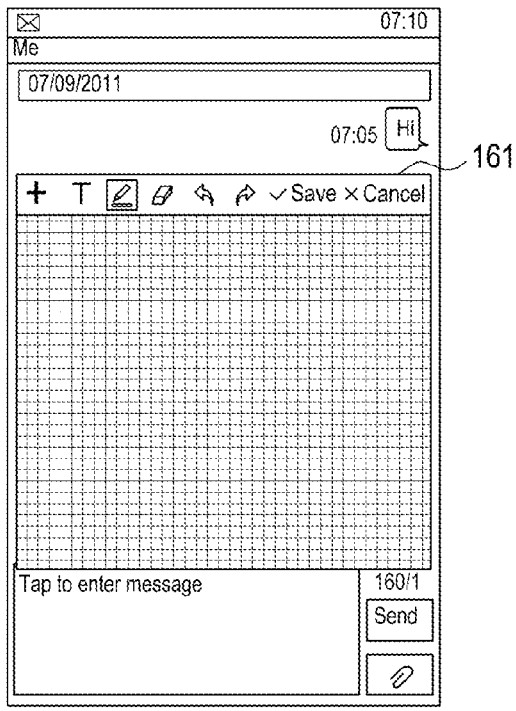
Figure 4C:
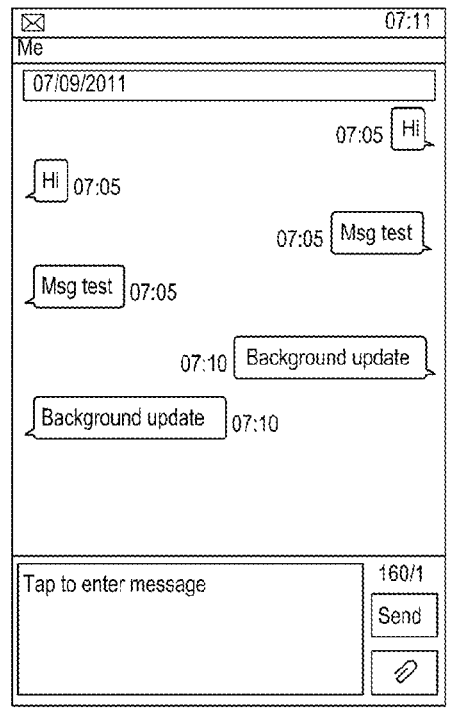

FIGS. 4A to 4C illustrate a process of running a memo application during use of a messenger application in a mobile terminal according to an exemplary embodiment of the present invention.

Referring to FIGS. 4A to 4C, while running a messenger application, as shown in FIG. 4A, if a touch event to run the memo application occurs on the screen displaying the messenger application, regardless of the area at which the touch event occurs, for example, if two touch inputs occur continuously within a predetermined time, then a separate window may be displayed so as to overlap the screen window 161 for running the memo application on the current screen displaying the running of the messenger application, as shown in FIG. 4B.

While displaying the screen window 161, as shown in FIG. 4B, if a touch event occurs and is maintained in an area of the screen other than the area displaying the screen window 161, then the screen window 161 may be hidden, as shown in FIG. 4C, thus, allowing the user to view the current screen displaying the messenger application. When updating of the application is set to occur only in the state where the screen window 161 is hidden, if a synchronization time for the messenger application is longer than a time period from the time when the screen window 161 was displayed until the time when the screen window was hidden, the messenger application is updated in the state where the screen window 161 is hidden, as shown in FIG. 4C, and thus, it is possible to display the conversations made while the screen window 161 is displayed. If the touch input having occurred is terminated while in the state shown in FIG. 4C, then the screen window 161 may be displayed again, as shown in FIG. 4B.

FIGS. 5A to 5D illustrate a process of running a memo application in a standby mode in a mobile terminal according to an exemplary embodiment of the present invention.

Figure 5A:
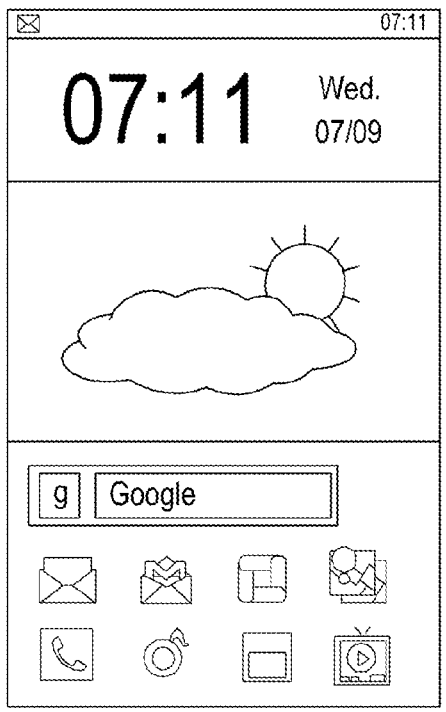
FIGS. 5A to 5D illustrate a process of running a memo application in a standby mode in a mobile terminal according to an exemplary embodiment of the present invention.
Figure 5B:
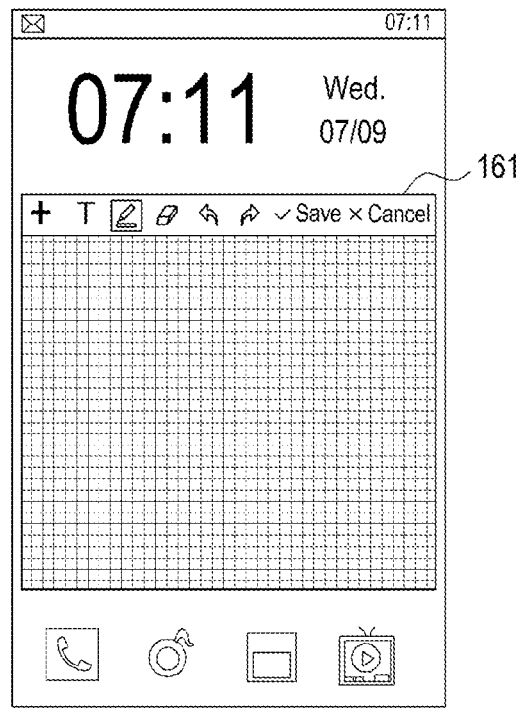
Figure 5C:
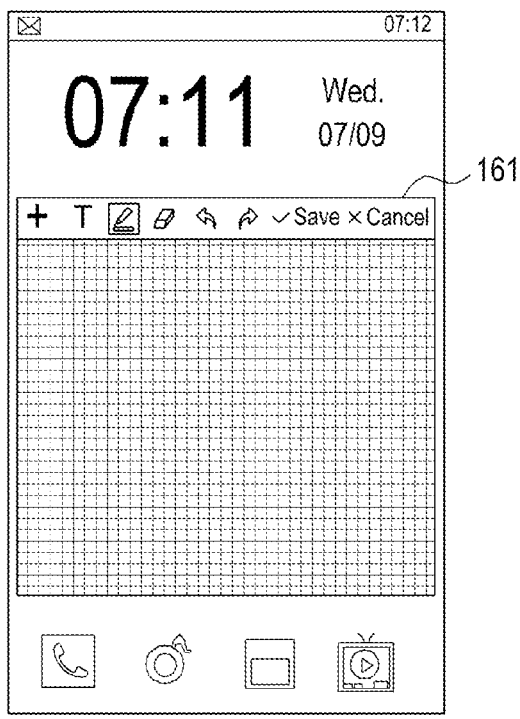

Referring to FIGS. 5A to 5D, in a standby mode, as shown in FIG. 5A, if a touch event to run a memo application occurs, then a separate window is displayed so as to overlap the screen window 161 for running the memo application on the standby mode screen as shown in FIGS. 5B and 5C.

Figure 5D:
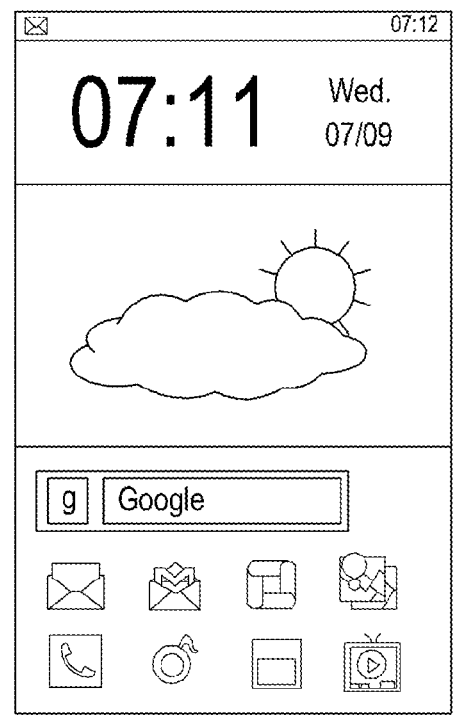

While displaying the screen window 161, as shown in FIGS. 5B and 5C, if a touch event occurs and is maintained in an area of the screen other than the area displaying the screen window 161, then the screen window 161 is hidden and the standby screen is displayed, as shown in FIG. 5D. If the touch input having occurred is terminated while in the state shown in FIG. 5D, then the screen window 161 is again displayed, as shown in FIGS. 5B and 5C.

If updating of the application is set to occur only in the state where the screen window 161 is hidden, then updating of a time widget from a displayed time of '07:11' to the current time '07:12' is not performed while the screen window 161 is displayed, as shown in FIG. 5C. If updating of the application is set only to occur when the screen window 161 is exited, updating the displayed time of '07:11' of the time widget to the current time '07:12' is not performed even while the screen window 161 is hidden, as shown in FIG. 5D.

Figure 6A:
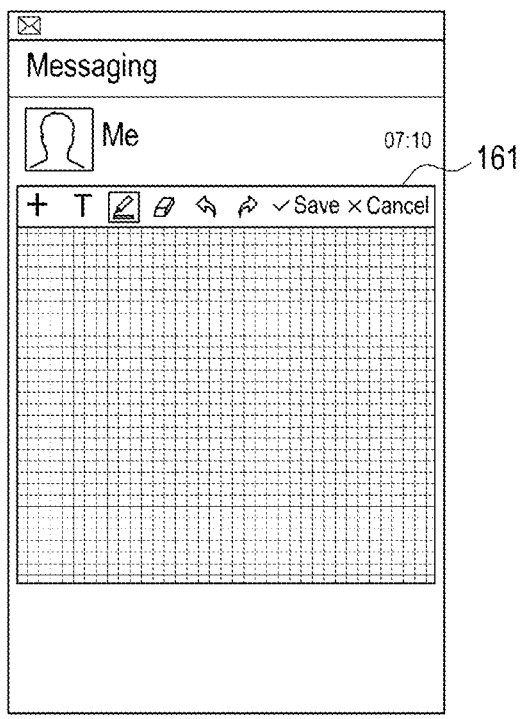
FIGS. 6A and 6B illustrate a process of running a memo application during use of a message application in a mobile terminal according to an exemplary embodiment of the present invention.
Figure 6B:
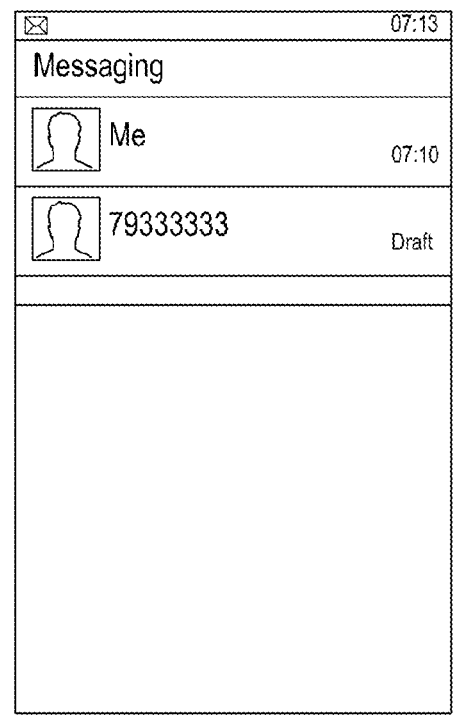

FIGS. 6A and 6B illustrate a process of running a memo application during use of a message application in a mobile terminal according to an exemplary embodiment of the present invention.

Referring to FIGS. 6A and 6B, if a touch event corresponding to executing a memo application occurs on a current screen displaying the message application, then a separate window is displayed by overlapping the screen window 161 for running the memo application on the current screen displaying the message application, as shown in FIG. 6A. While displaying the screen window 161, as shown in FIG. 6A, if a touch event occurs and is maintained in an area of the screen other than the area displaying the screen window 161, then the screen window 161 is hidden and the current screen displaying the message application is displayed, as shown in FIG. 6B. If the touch input is terminated while in a state shown in FIG. 6B, then the screen window 161 may be displayed again, as shown in FIG. 6A.

Figure 7A:
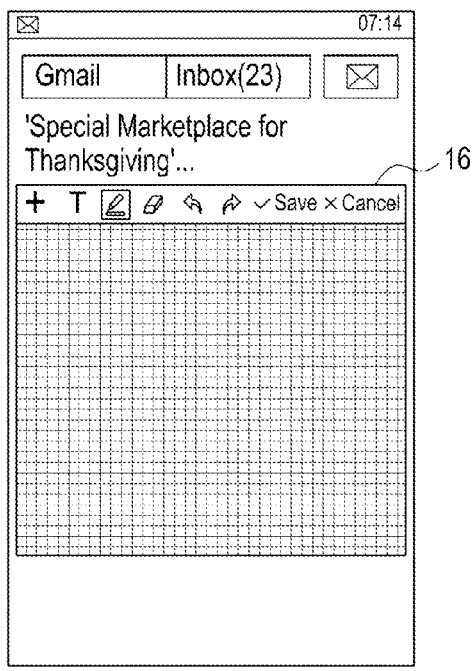
FIGS. 7A and 7B illustrate a process of running a memo application during use of an e-mail application in a mobile terminal according to an exemplary embodiment of the present invention.
Figure 7B:
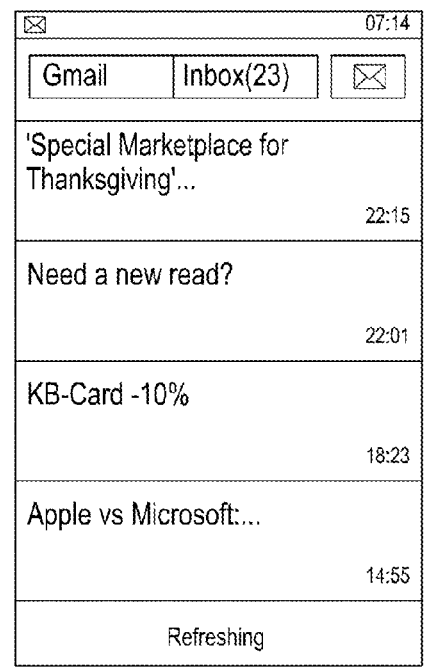

FIGS. 7A and 7B illustrate a process of running a memo application during use of an e-mail application in a mobile terminal according to an exemplary embodiment of the present invention.

Referring to FIGS. 7A and 7B, if a touch event corresponding to executing the memo application occurs on the current screen displaying an e-mail application, then a separate window is displayed by overlapping the screen window 161 for running the memo application on the current screen displaying the e-mail application, as shown in FIG. 7A.

While displaying the screen window 161, as shown in FIG. 7A, if a touch event occurs and is maintained in an area of the screen other than the area displaying the screen window 161, then the screen window 161 is hidden, and the current screen displaying the e-mail application is displayed, as shown in FIG. 7B. If the touch input is terminated while in a state shown in FIG. 7B, then the screen window 161 may be displayed again, as shown in FIG. 7A.

As is apparent from the foregoing description, the present exemplary embodiments of an application running apparatus and method for a mobile terminal may quickly run, execute and switch between user-desired applications, and allow the user to easily view the contents of the background screen while running the application on the screen window. In addition, the present exemplary embodiments of an application running apparatus and method may use the data executed on a screen window for running an application as data for another application.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for running an application in a mobile terminal, comprising:
    a display configured to display a current screen corresponding to an application running on the mobile terminal and to display an object for running another application on the current screen; and
    a controller configured to control displaying of the object for running the other application according to a first touch event, and to control hiding the object in response to a second touch event having occurred in an external area of the object while displaying the object,
    wherein the controller is configured to control the displaying of the object for running the other application so that the object overlaps the current screen corresponding to the application running on the mobile terminal.

2. The apparatus of claim 1, wherein if a third touch event occurs on the object while displaying the object, the controller exits the object being displayed, and displays another object for running an application corresponding to the third touch event having occurred.

3. The apparatus of claim 1, wherein if a touch event occurs on the object while displaying the object, the controller displays a list of applications, exits the object being displayed, and then displays another object for running an application selected from the list of applications.

4. The apparatus of claim 1, wherein if the touch event having occurred in an external area of the object is terminated, the controller displays again the object.

5. The apparatus of claim 1, wherein if a new application is selected on a current screen by a drag event having occurred with the touch event maintained in a state where the object is hidden, the controller stores data executed on the object as data for the new application selected by the touch and drag events, and exits the hidden object.

6. The apparatus of claim 1, wherein the controller updates the application in a state where the object is hidden.

7. The apparatus of claim 1, wherein if an exit is selected on the object while displaying the object, the controller exits the object for running an application.

8. The apparatus of claim 1, wherein the controller is configured to update the application running on the mobile terminal while displaying the object for running the other application.

9. The apparatus of claim 8, wherein the controller is configured to update the application running on the mobile terminal if a synchronization time of the application is greater than a time period from a time when the current screen is displayed until a time when the object for running the application is displayed.

10. A method for running an application in a mobile terminal, comprising:
   displaying a current screen corresponding to an application running on the mobile terminal,
   displaying an object for running another application on the current screen according to a first touch event; and
   hiding the object if a second touch event occurs in an external area of the object while displaying the object,
   wherein the displaying of the object for running the other application includes displaying the object as overlapping the current screen corresponding to the application running on the mobile terminal.

11. The method of claim 10, further comprising:
   if a third touch event occurs on the object while displaying the object, exiting the object being displayed; and
   displaying another object for running an application corresponding to the third touch event having occurred.

12. The method of claim 11, further comprising:
   if a touch event occurs on the object while displaying the object, displaying a list of applications; and
   if an application is selected from the list of application, exiting the object being displayed, and then displaying another object for running the selected application.

13. The method of claim 10, further comprising:
   if the touch event having occurred in an external area of the object is terminated, displaying again the object.

14. The method of claim 10, further comprising:
   if an application is selected on a current screen by a drag event having occurred with the touch event maintained in a state where the object is hidden, storing data executed on the object as data for the application selected by the touch and drag events; and
   exiting the hidden object.

15. The method of claim 10, further comprising updating the application in a state where the object is hidden.

16. The method of claim 10, further comprising:
   if an exit is selected on the object while displaying the object, exiting the object for running an application.

17. The method of claim 10, further comprising updating the application running on the mobile terminal while displaying the object for running the other application.

18. The method of claim 17, wherein the updating of the application running on the mobile terminal occurs if a synchronization time of the application is greater than a time period from a time when the current screen is displayed until a time when the object for running the application is displayed.

* * * * *